(12) United States Patent
Cook (10) Patent No.: US 7,509,667 B1
(45) Date of Patent: Mar. 24, 2009

(54) BROADBAND CONTENT JUKEBOX WITH PROFILE-BASED CACHING

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1404 days.

(21) Appl. No.: 10/219,650

(22) Filed: Aug. 15, 2002

(51) Int. Cl.
*H04N 7/173* (2006.01)
*H04N 7/167* (2006.01)
*H04N 7/16* (2006.01)
*G06F 15/16* (2006.01)
*G06N 7/00* (2006.01)

(52) U.S. Cl. .................. 725/87; 725/86; 725/104; 725/25; 725/9; 380/200; 709/233; 707/104.1

(58) Field of Classification Search ............ 725/25, 725/86, 87, 104, 9; 380/200; 709/233; 707/104.1
See application file for complete search history.

(56) References Cited

U.S. PATENT DOCUMENTS

| | | | |
|---|---|---|---|
| 5,130,792 A | | 7/1992 | Tindell et al. |
| 5,761,607 A | | 6/1998 | Gudesen |
| 6,016,520 A | * | 1/2000 | Facq et al. ............... 710/33 |
| 6,226,618 B1 | | 5/2001 | Downs et al. |
| 6,701,528 B1 | * | 3/2004 | Arsenault et al. ......... 725/89 |
| 6,779,040 B1 | * | 8/2004 | Lee et al. ............... 709/247 |
| 6,854,009 B1 | * | 2/2005 | Hughes ................. 709/220 |
| 6,928,051 B2 | * | 8/2005 | Butt et al. ............... 370/230 |
| 2002/0116517 A1 | * | 8/2002 | Hudson et al. ........... 709/231 |
| 2003/0204613 A1 | * | 10/2003 | Hudson et al. ........... 709/231 |
| 2006/0085821 A9 | * | 4/2006 | Simmons et al. .......... 725/61 |

FOREIGN PATENT DOCUMENTS

KR 10-2002-0062595 * 7/2002

* cited by examiner

*Primary Examiner*—Hoang-Vu A Nguyen-Ba (57) ABSTRACT

The present invention employs a cache for storing a large repository of digital media files (i.e., content) in a local hard drive of individual users, whereby a slower delivery mechanism can be used to add potentially wanted files to each cache in advance of any request for viewing the files. Combining a large cache size along with user and content profiling allows a target file desired by a user to be found in the cache for a great majority of file requests. Cached files are encrypted. To view a file, the user must first provide payment information to a content server in order to obtain authorization and a decryption key.

34 Claims, 5 Drawing Sheets

BROADBAND CONTENT JUKEBOX WITH PROFILE-BASED CACHING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to distribution of digital file content over a computer network such as the Internet, and, more specifically, to achieving distribution of voluminous digital media files to individual users consistent with digital rights management and primarily using inexpensive, low priority network traffic.

As a typical Internet user's connection speed increases, it becomes more feasible to transport various kinds of digital content over the Internet including multimedia files such as music videos and movies. Content can be received by a user in the form of a downloaded file wherein the entire file is downloaded prior to viewing or as a streaming file which is viewed in real time as the content is received. Streaming is advantageous in that the user may begin to view the desired file almost immediately after sending a request to receive it. However, streaming is sensitive to network latency times, and viewing may be disrupted when network congestion causes data packets to arrive later than needed.

Network resources can be designed to support a system wherein various network traffic is grouped according to a respective quality of service (QoS) so that higher priority traffic is routed away from congestion and arrives at the destination with shorter latency times. However, the resources dedicated to handling the high QoS traffic must be used at much less than their full capacity in order to guarantee the desired latency. Consequently, the cost of obtaining a high QoS transmission channel is higher.

Another advantage of streaming is that the content itself is not permanently stored in the recipient's computer. The received traffic is fed as data to a multimedia player for immediate use, typically without storing on a hard drive. Thus, it is easier for a copyright owner to limit further distribution of their copyrighted content.

To protect the rights of the owner of the digital content, the streamed or downloaded files may be encrypted so that they cannot be viewed without also possessing the correct decryption key. Since the key is usually transmitted to the user via network traffic in close proximity to the network traffic containing the encrypted files, it is possible for an encrypted file and its key to be intercepted by a third party.

SUMMARY OF THE INVENTION

The present invention provides a system and method wherein content can be distributed at low overall costs, while allowing users to view the content immediately upon request and maintaining a high level of security of the digital content files.

In one aspect of the invention, a distribution system for distributing pay-to-access electronic files from a content provider to a plurality of users comprises a data network and a file transfer manager having access to a library of the electronic files. Each electronic file has an associated set of labels wherein the labels have predetermined label values for classifying each respective electronic file. Each electronic file includes an encrypted content portion requiring a predetermined key for decryption. A profile database stores a plurality of profiles, each profile corresponding to a respective user having a respective data network address (e.g., static or dynamic IP address or a service name or URL) within the data network and including at least one profile value. The profile database may be centrally located within a content server or may be distributed such that each profile is stored locally by each respective user. The predetermined label values are compared to the profile value and when a match is found then the file transfer manager broadcasts a respective electronic file to a corresponding data network address via the data network. A cache is maintained locally by each respective user for storing each electronic file broadcast to a respective data network address. A jukebox interface for each respective user is implemented using a respective computer assigned to the respective data network address. The jukebox interface enables the respective user 1) to configure their corresponding profile in the profile database, 2) to select a desired electronic file, and 3) to send an access request for the desired electronic file. An authorization and accounting server receives the access request via the data network, obtains authorization based on an identity of the requesting user, checks whether the desired electronic file is locally cached by the requesting user, and if locally cached then sends a decryption key for the desired electronic file to the requesting user. Otherwise, the authorization and accounting server sends a decryption key for the desired electronic file and commands the file transfer manager to deliver the desired electronic file to the requesting user. A decryptor within the respective computer receives the decryption key and decrypts the desired electronic file. A player reproduces the decrypted desired electronic file for the user.

DETAILED DESCRIPTION OF PREFERRED EMBODIMENTS

The present invention employs a cache for storing a large repository of digital media files (i.e., content) in a local hard drive of individual users, wherein a slower delivery mechanism is used to add potentially wanted files to each cache in advance of any request for viewing the files. Combining a large cache size along with user and content profiling allows a target file desired by a user to be found in the cache for a great majority of file requests.

A large cache size can be obtained at very low cost due to advances in hard drive technologies. Hard drives with capacities of 100 gigabytes have become common, and inexpensive drives with 500 gigabyte capacities are becoming available. On average, a 500 gigabyte drive can hold up to 1,000 movies or 30,000 music videos. By using respective user profiles to identify potential content of interest to each user, each cache can be populated with most if not all digital content selections that could be expected to be requested by a particular user. Thus, the invention transmits encrypted content files to a user's cache according to the user's profile, using low priority (e.g., otherwise unused) bandwidth thereby avoiding most requests that must draw video content from a network-based streaming server.

Digital rights management is handled by requiring the requestor to negotiate with a network-based content server for authorization to use the cached content and to obtain a corresponding decryption key. The particular key given to a user may preferably only be functional to decrypt the particular copy of the content on the particular user's computer (i.e., a particular machine/content combination). After authorization and delivery of the decryption key, a command for initiating streaming of the desired file is re-directed to the local cache if the desired file is present there. Consequently, real-time network traffic loads are reduced by the present invention to signaling between the user and the content server (e.g., browsing available content and authorization messages) and an occasional video stream when the desired file is not found in the local cache.

Figure 1:
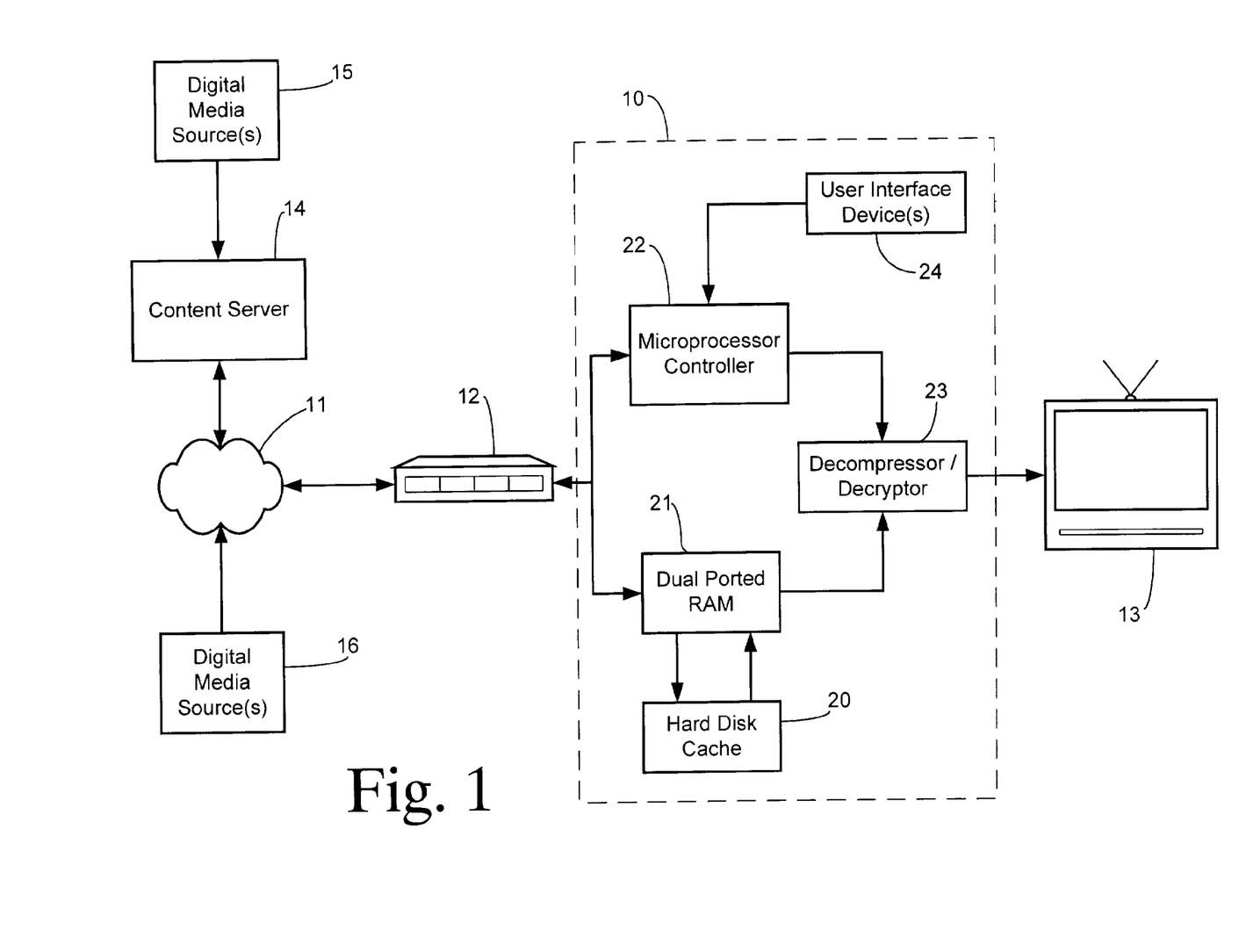
FIG. 1 is a block diagram showing a file distribution system of the present invention.

Referring to a first embodiment of the invention in FIG. 1, a customer premises video jukebox unit 10 is coupled to Internet 11 via a broadband access device 12, such as a cable modem or DSL. Unit 10 may comprise a general purpose computer or may be a dedicated device. It may, for example, be connected to a video and audio monitor 13 such as a television or computer monitor so that digital content media files transmitted from or on behalf of a content server 14 can be reproduced. The digital content media files may comprise prerecorded video and/or audio files (e.g., movies, trailers, music videos, clips, etc.) from various sources such as a digital media source 15 for supplying files directly to server 14 and a digital media source 16 coupled to content server 14 via Internet 11.

Jukebox unit 10 includes a hard disk cache 20 for storing a large collection of encrypted files of potential interest to a user of unit 10. Cache 20 is accessible through a dual-ported RAM 21 so that new content files can be written to cache 20 at the same time that an existing file can be read-out for viewing. A microprocessor controller 22 provides system control and is coupled to access device 12, RAM 21, a decompressor/decryptor 23, and a user interface device 24. Decompressor/decryptor 23 may use conventional compression (e.g., MPEG) and encryption (e.g., DES, RC2, AES, or NTRU) technology, preferably requiring a uniquely specified decryption key that must be obtained from content server 14. Interface device 24 may include a keyboard, mouse, trackball, and a display for allowing a user to browse and select available content files and to provide information for obtaining authorization to view a file (e.g., providing a credit card number).

Figure 2:
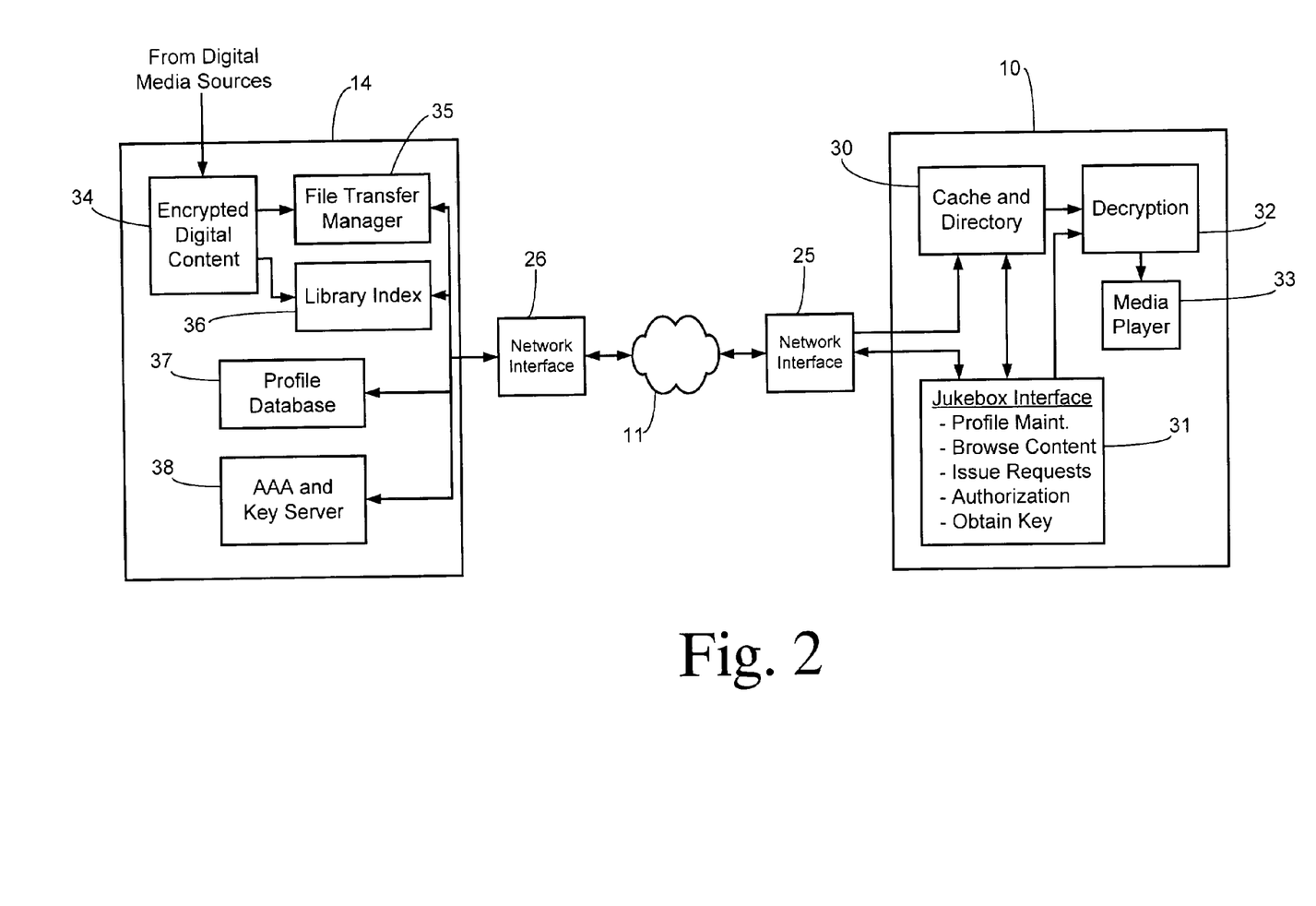
FIG. 2 is a block diagram showing certain aspects of the invention in greater detail.

FIG. 2 shows a further embodiment of the invention wherein jukebox unit 10 and content server 14 are coupled to Internet 11 via network interfaces 25 and 26, respectively. Jukebox unit 10 includes a hard disk cache 30 which may also contain a browsable directory for identifying electronic media files present in the cache. The directory reduces the need for a user to send network traffic to a content server to find a desired file. It should be noted that the directory information can be kept separately from the media files themselves and that the directory need not identify locally the actual file name under which the encrypted file is stored in the cache. The file name can be provided along with the decryption key after a successful authorization.

A jukebox interface 31 provides the functions of 1) accessing a user profile for creation, updating, and maintenance, 2) browsing available content file either via a local directory or one stored on the content server, 3) initiating a request for viewing a desired one of the electronic files, 4) interfacing with an authorization and authentication server, and 5) obtaining a decryption key needed to view the desired file. The decryption key is provided to decryption block 32 so that the desired file from cache 30 can be decompressed and decrypted before being streamed to a media player 33. In the embodiment of FIG. 2, jukebox unit 10 can be comprised of a general purpose personal computer, for example.

In content server 14, a large storage resource 34 holds the encrypted digital content obtained from the digital media sources and being made available by server 14. A file transfer manager 35 sends out digital files for storage at all the local caches, as will be described below. A library index 36 includes descriptions of all the content files available from storage 34 including associated sets of labels that classify each file in the library according to predefined data elements such as genre, actors, director, words in title, rating, artist, and musician. A set of labels for a particular file has label values that are permanently associated with the corresponding file and that may be searched to locate desired files.

A profile database 37 includes records corresponding to one or more users associated with each jukebox unit. Each record includes profile values for matching with the label values of the digital content files. An AAA and key server 38 performs the functions of authentication, authorization, and accounting for a user requesting access to a desired file, and if these functions are successful, then forwarding the necessary decryption key to the user.

Rather than a centralized profile database as shown in FIG. 2, a distributed database could be used such that the records for each individual user is maintained locally within their jukebox interface. In that embodiment, the content server would transmit to each user a movie label and a multicast group number for receiving the movie. For instance, each jukebox interface client would join a "label advertising" multicast session and watch for matches with the locally stored profile. When a match is detected, the client then joins the multicast session group number that was advertised for the matching content. This embodiment removes overhead requirements from the content server by keeping profile generation and management functions at the local, user level.

Figure 3:
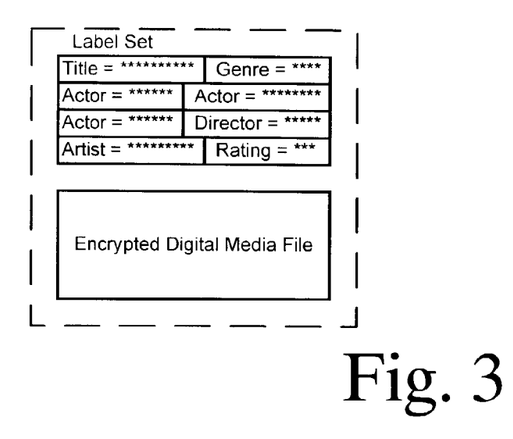
FIG. 3 shows a label set defined for a particular digital media file.

FIG. 3 shows sample contents of the library of encrypted digital files 34 in server 14. Along with each digital media file, a label set is stored which contains assigned label values for predetermined labels such as title, genre, actors, director, artist, and rating. The label values may be assigned by the digital media sources, for example. When a digital media file is cached to the local cache of a user, the label set may also be transferred and stored as part of a directory for allowing the user to locally search for a desired file. Alternatively, the label set information may be kept only at the content server so that anonymity of encrypted files is maintained during distribution and while resident in the local caches.

Figure 4:
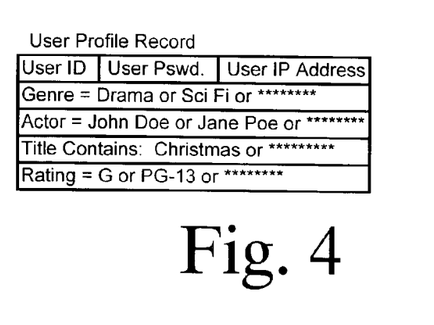
FIG. 4 shows a sample user profile record from a profile database.

FIG. 4 shows a sample record for a user profile in profile database 37 of content server 14. Fields for each user profile may include a user ID, user password (for controlling write and read access to the record), a user IP address, and profile values corresponding to the predetermined labels for classifying the digital media files. For example, the genre label may have profile values of "drama" and "sci fi" for the example user. It should be noted that more than one user profile can share the same IP address and local cache.

Figure 5:
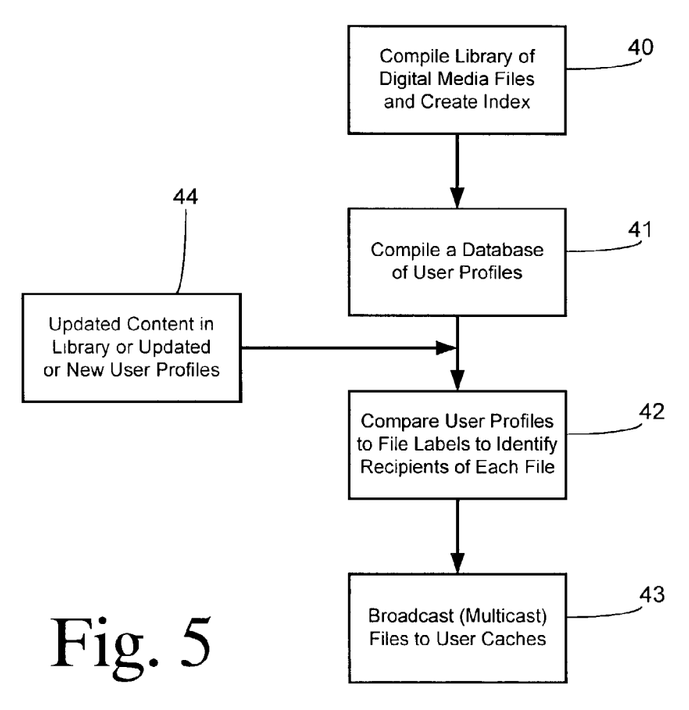
FIG. 5 is a flowchart showing a preferred method for distributing files to local caches.

FIG. 5 shows a preferred embodiment of a distribution process of the invention. A library of digital media files is compiled, encrypted, and indexed in step 40. A database of user profiles is compiled in step 41 (e.g., by allowing users to log-on to the content server and configure their desired profiles). In step 42, the content server compares the profile values of each user profile to the label values of the electronic files in the library. Each match identifies a user to whom an electronic file should be sent for caching.

In step 43, the identified files are broadcast over the network (e.g., Internet) to the local caches of the identified users at the IP addresses obtained from the user profiles. Since the file transfer is not being used for viewing in real time, the broadcast does not use a high priority traffic channel, but can be accomplished at a lower priority traffic level. Preferably, the broadcast may be comprised of multicasting each file to the set of matching users. Thus, the content server would send individual IP messages to each user in the set to inform the respective jukebox units of a multicast group number at which the matching file will be multicast. Each jukebox unit then joins the multicast group to receive the file(s). Preferably, the multicasting of each file to matching users employs "packet generalization." This known technology reduces load on the content server and the distribution network by removing re-transmissions.

In step 44, updates are made to the content library and/or new or updated user profiles become available, which requires additional profile comparisons in step 42. For example, when a new digital media file is made available, it is compared to all the available user profiles and then is multicast to users with a matching profile. When a new or updated user profile becomes available, it is compared to the library files and the matching files may be unicast to the user. Alternatively, distribution of files may be scheduled periodically so that they can be multicast to all matching users that are newly identified during the period.

In one preferred embodiment, a user's profile can be automatically updated in accordance with the label sets of digital media files accessed by the user. Thus, when the content server authorizes a user to access a particular file, the content server adds the label values from the label set for the particular file to the user's profile. In particular, the invention may employ a "probability-refined" profile. For instance, when a user profile is established with a broad genre description, the user's actual selections are used to refine their corresponding label-selection filter. For example, if a user specifies science fiction as a desired genre in their setup and subsequently the user frequently selects outer space movies with specific actors appearing in multiple selections, then the inventive system refines the "science fiction" filter to prioritize outer space movies with the particular actors (i.e., those movies are downloaded and retained in the cache at higher priority than other science fiction titles).

Figure 6:
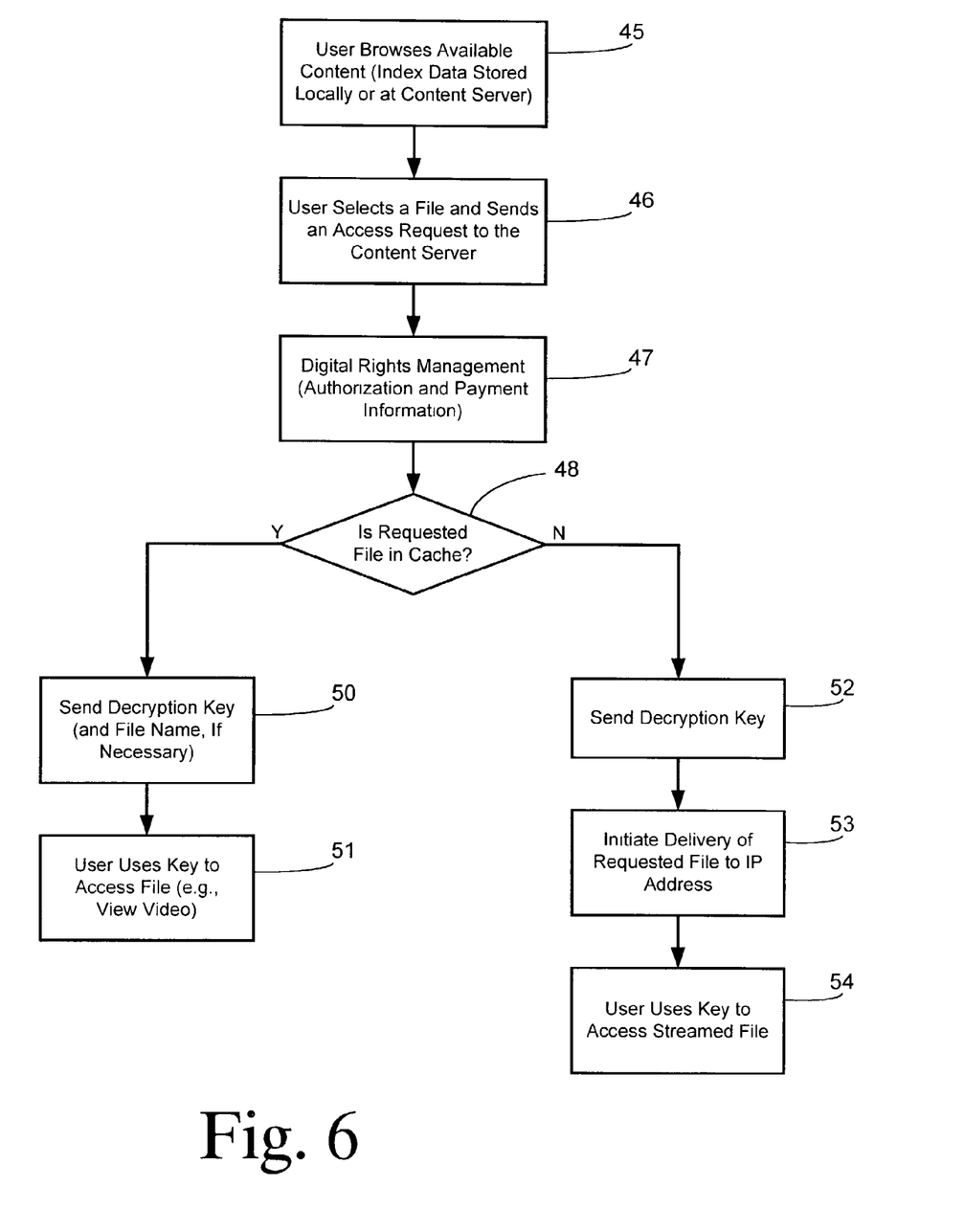
FIG. 6 is a flowchart showing a preferred method for selecting and viewing desired content.

FIG. 6 shows a preferred embodiment for user access to (e.g., viewing of) the distributed files. In step 45, a user browses the available content. The browsed index or other information may be stored either locally within their jukebox unit or centrally on the content server. In step 46, the user decides on and selects a file for viewing (or otherwise accessing if not a video file). The jukebox unit sends an access request to the content server. A known digital rights management process is performed in step 47 via the AAA server wherein the user may provide payment information and obtains authorization to view the file.

A check is made in step 48 to determine whether the desired file is present within the local cache. If it is present, then the decryption key and the file name of the encrypted file, if necessary, are sent to the jukebox unit of the user in step 50. In step 51, the user's jukebox unit uses the key to access the file (e.g., play the video).

If the desired file is not present in the local cache, then a decryption key is generated by the content server and sent in step 52. Delivery of the desired file to the user's jukebox unit is initiated in step 53. This delivery can be in the form of a real-time stream or a standard download into the cache, at the user's option. In step 54, the user's jukebox unit uses the key to access the streaming file.

Figure 7:
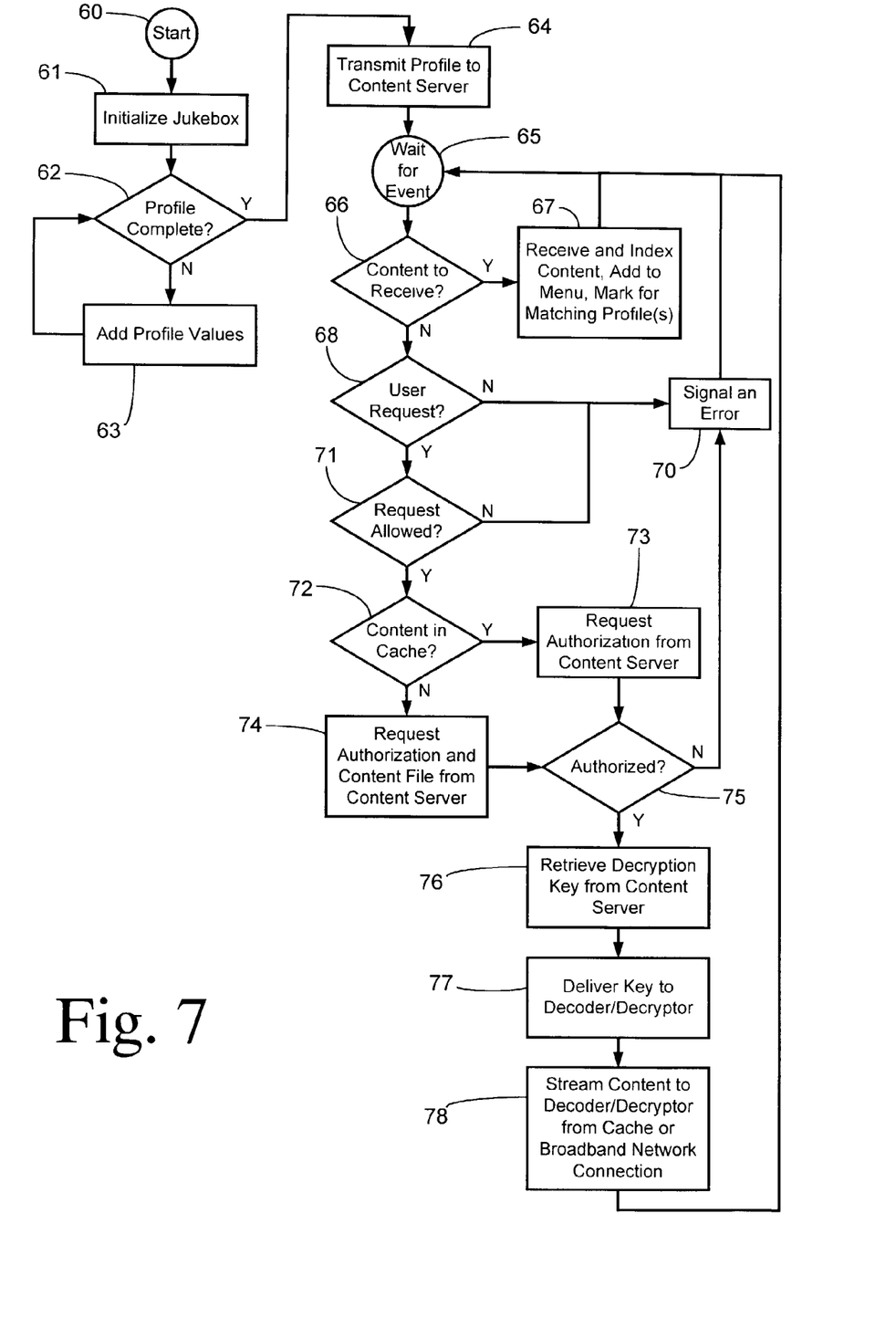
FIG. 7 is a flowchart showing operation of the jukebox unit in greater detail.

A method of operating a jukebox unit begins at step 60 of FIG. 7. In step 61, the jukebox unit is first initialized and gathers information for at least one user profile. In step 62, a check is made to determine whether the profile is complete. If not, then profile values are added in step 63. Once the profile is complete, it is transmitted to the content server in step 64 and the jukebox unit waits for a subsequent event in step 65.

When an event occurs, a check is made in step 66 to determine if there is content to receive from the content server. If so, then the content is received and indexed in step 67. Each received file may be added to a selection menu for browsing. Each file may also be marked to identify the matching profiles where more than one user profile is associated with the jukebox unit. When the indexing is complete, a return is made to step 65 to wait for the next event.

If an event is not triggered by content to be received, then a check is made in step 68 to determine whether there has been a user request. If not, then an error may be signaled in step 70 and any error handling in the jukebox unit may be initiated. If there is a user request, then it is first checked in step 71 whether the particular request is allowed (e.g., parental controls may be in place to prevent viewing of certain files by certain users). If the request is not allowed, then an error may be signaled in step 70.

If the request is allowed according to rules present in the jukebox unit, then a check is made in step 72 to determine whether the desired file is present in the local cache. If it is, then viewing authorization is requested from the content server in step 73. Otherwise, a request is made to the content server for both an authorization to view the file and a streaming delivery of the file in step 74. Rather than streaming of the desired file, the user could select to have a standard download of the file into the cache for later viewing. During the download, an estimated time of availability for viewing could be presented to the user.

Once the request(s) are sent, the jukebox interacts with the content server according the a digital rights management process. A check is made in step 75 to determine whether access has been authorized. If not, then an error is signaled in step 70. If authorization is received, then the jukebox unit retrieves the necessary decryption key from the content server in step 76. The key is delivered to the decoder/decryptor of the jukebox unit in step 77. In step 78, the desired digital content file is streamed to the decoder/decryptor either from the cache or from the broadband network connection.

What is claimed is:

1. A distribution system for distributing pay-to-access electronic files from a content provider to a plurality of users, comprising:
   a data network;
   a file transfer manager having access to a library of said electronic files, each electronic file having an associated set of labels wherein said labels have predetermined label values for classifying each respective electronic file, each electronic file including an encrypted content portion requiring a predetermined key for decryption;

a profile database storing a plurality of profiles, each profile corresponding to a respective user having a respective data network address within said data network and including at least one profile value, wherein said predetermined label values are compared to said profile value and when a match is found then said file transfer manager transfers a respective electronic file to a corresponding data network address of said respective user via said data network at less than a top priority of network traffic prior to any access request for said respective electronic file from said respective user;

a cache maintained locally by each respective user for storing each electronic file transferred to a respective data network address;

a jukebox interface for each respective user implemented using a respective computer assigned to said respective data network address, said jukebox interface enabling said respective user 1) to configure a corresponding profile in said profile database, 2) to select a desired electronic file, and 3) to send an access request for said desired electronic file;

an authorization and accounting server receiving said access request via said data network, obtaining authorization based on an identity of said requesting user, checking whether said desired electronic file is locally cached by said requesting user, and if locally cached then sending a decryption key for said desired electronic file to said requesting user, otherwise sending a decryption key for said desired electronic file and commanding said file transfer manager to deliver said desired electronic file to said requesting user in real time;

a decryptor within said respective computer for receiving said decryption key and decrypting said desired electronic file; and a player for reproducing said decrypted desired electronic file.

2. The system of claim 1 wherein said transfer of a respective electronic file when a match is found is comprised of multicasting using a traffic priority less than a highest priority.

3. The system of claim 1 wherein said electronic files include prerecorded multimedia.

4. The system of claim 3 wherein said prerecorded multimedia include video.

5. The system of claim 3 wherein said labels are selected from a group comprising genre, actor, director, title, artist, and musician.

6. The system of claim 3 wherein said player is comprised of a multimedia player within said respective computer.

7. The system of claim 3 wherein said player is comprised of an audiovisual monitor connected to said respective computer.

8. The system of claim 1 wherein said cache is comprised of a hard drive.

9. The system of claim 1 wherein said profile of said respective user is updated to include profile values corresponding to predetermined label values of said desired electronic file.

10. The system of claim 1 wherein said jukebox interface enables said respective user to select a desired electronic file by searching for electronic files within said library.

11. The system of claim 1 wherein a file name under which said desired electronic file was previously stored in said cache is sent to said requesting user with said decryption key.

12. The system of claim 1 wherein said authorization includes a specification by said requesting user of payment information.

13. A distribution system for distributing pay-to-access electronic files from a content provider to a plurality of users, comprising:

a data network;

a file transfer manager having access to a library of said electronic files, each electronic file having an associated set of labels wherein said labels have predetermined label values for classifying each respective electronic file, each electronic file including an encrypted content portion requiring a predetermined key for decryption;

a profile database storing a plurality of profiles, each profile corresponding to a respective user having a respective data network address within said data network and including at least one profile value, wherein said predetermined label values are compared to said profile value and when a match is found then said a respective electronic file is delivered to a corresponding data network address of said respective user via said data network at less than a top priority of network traffic prior to any access request for said respective electronic file from said respective user;

a cache maintained locally by each respective user for storing each electronic file received by a respective data network address;

a jukebox interface for each respective user implemented using a respective computer assigned to said respective data network address, said jukebox interface enabling said respective user 1) to configure a corresponding profile in said profile database, 2) to select a desired electronic file, and 3) to send an access request for said desired electronic file;

an authorization and accounting server receiving said access request via said data network, obtaining authorization based on an identity of said requesting user, checking whether said desired electronic file is locally cached by said requesting user, and if locally cached then sending a decryption key for said desired electronic file to said requesting user, otherwise sending a decryption key for said desired electronic file and commanding said file transfer manager to deliver said desired electronic file to said requesting user in real time;

a decryptor within said respective computer for receiving said decryption key and decrypting said desired electronic file; and a player for reproducing said decrypted desired electronic file.

14. A jukebox for accessing pay-for-access electronic files distributed from a content server to a user via a broadband data network, each electronic file having an associated set of labels wherein said labels have predetermined label values for classifying each respective electronic file, each electronic file including an encrypted content portion requiring a predetermined key for decryption, said jukebox being located at a premises of said user, said jukebox comprising:

a cache for storing a plurality of said electronic files received in encrypted form from said broadband data network, said electronic files being pushed to said cache at less than a top priority of network traffic without any prior user request for accessing said plurality of electronic files;

a jukebox system interface for communicating with said content server 1) to configure a user profile stored in a profile database in said content server, said user profile including profile values for matching with said labels, 2)

to select a desired electronic file, 3) to send an access request for said desired electronic file to said content server if said desired electronic file is not present in the cache and to receive said desired electronic file in real time, and 4) to obtain a corresponding decryption key for said desired electronic file by performing an authorization with said content server;

a decryptor for retrieving said desired electronic file from said cache and decrypting said desired electronic file in response to said decryption key; and a file player for reproducing said desired electronic file after decryption.

15. The jukebox of claim 14 wherein said cache is comprised of a hard drive.

16. The jukebox of claim 14 wherein a file name under which said desired electronic file was previously stored in said cache is obtained with said decryption key.

17. The jukebox of claim 14 wherein said electronic files include prerecorded multimedia.

18. The jukebox of claim 17 wherein said prerecorded multimedia include video.

19. The jukebox of claim 14 wherein said file player is comprised of a multimedia player within a respective computer.

20. The jukebox of claim 14 wherein said file player is comprised of an audiovisual monitor connected to a respective computer.

21. A jukebox for accessing pay-for-access electronic files distributed from a content server to a user via a broadband data network, each electronic file having an associated set of labels wherein said labels have predetermined label values for classifying each respective electronic file, each electronic file including an encrypted content portion requiring a predetermined key for decryption, said jukebox being located at a premises of said user, said jukebox comprising:

a cache for storing a plurality of said electronic files received in encrypted form from said broadband data network, said electronic files being pushed to said cache at less than a top priority of network traffic without any prior user request for accessing said plurality of electronic files;

a jukebox system interface for 1) configuring a user profile stored in a profile database, said user profile including profile values for matching with said labels, 2) selecting a desired electronic file, 3) if a selected electronic file is not present in the cache then sending an access request for said desired electronic file to said content server and receiving the selected electronic file in real time, and 4) obtaining a corresponding decryption key for said desired electronic file by performing an authorization with said content server;

a decryptor for retrieving said desired electronic file from said cache and decrypting said desired electronic file in response to said decryption key; and a file player for reproducing said desired electronic file after decryption.

22. A content server for distributing pay-to-access electronic files to a plurality of users via a data network, each respective user having a local cache for storing a plurality of said electronic files, said content server comprising:

a file transfer manager having access to a library of said electronic files, each electronic file having an associated set of labels wherein said labels have predetermined label values for classifying each respective electronic file, each electronic file including an encrypted content portion requiring a predetermined key for decryption;

a profile database storing a plurality of profiles, each profile corresponding to a respective user having a respective data network address within said data network and including at least one profile value, wherein each of said profiles is configurable by a respective user, and wherein said predetermined label values are compared to said profile value and when a match is found then said file transfer manager transfers a respective electronic file to a corresponding data network address via said data network at less than a top priority of network traffic prior to any access request for said respective electronic file from said respective user;

an authorization and accounting server receiving an access request from a user via said data network identifying a desired electronic file, obtaining authorization based on an identity of said requesting user, checking whether said desired electronic file is locally cached by said requesting user, and if locally cached then sending a decryption key for said desired electronic file to said requesting user, otherwise sending a decryption key for said desired electronic file and commanding said file transfer manager to stream said desired electronic file to said requesting user in real time.

23. The content server of claim 22 wherein said transfer of a respective electronic file when a match is found is comprised of multicasting using a traffic priority less than a highest priority.

24. The content server of claim 22 wherein said electronic files include prerecorded multimedia.

25. The content server of claim 24 wherein said prerecorded multimedia include video.

26. The content server of claim 22 wherein said labels are selected from a group comprising genre, actor, director, title, artist, and musician.

27. The content server of claim 22 wherein said profile of said requesting user is updated to include profile values corresponding to predetermined label values of said desired electronic file.

28. The content server of claim 22 wherein said requesting user selects a desired electronic file by searching for electronic files within said library.

29. The content server of claim 22 wherein a file name under which said desired electronic file was previously stored in said local cache is sent to said requesting user with said decryption key.

30. The content server of claim 22 wherein said authorization includes the specification by said requesting user of payment information.

31. A method of distributing pay-to-access electronic files from a content provider to a plurality of users via a data network, said method comprising the steps of:

compiling a library of said electronic files, each electronic file having an associated set of labels wherein said labels have predetermined label values for classifying each respective electronic file, each electronic file including an encrypted content portion requiring a predetermined key for decryption;

compiling a profile database storing a plurality of profiles, each profile corresponding to a respective user and including a respective data network address within said data network and at least one profile value;

comparing said predetermined label values for a particular electronic file with said plurality of profiles to determine a plurality of matching profiles;

transferring said particular electronic file to each corresponding data network address of said matching profiles via said data network at less than a top priority of network traffic prior to any access request for said particular electronic file from said respective users;

storing said transferred electronic file in respective caches of said plurality of users that receive said transfer;

a requesting user selecting a desired electronic file from said library for reproduction and sending an access request to said content provider identifying said desired electronic file;

said content provider performing authorization in response to an identity of said requesting user;

checking whether said desired electronic file is locally cached by said requesting user, and if locally cached then sending a decryption key for said desired electronic file to said requesting user, otherwise sending a decryption key for said desired electronic file and streaming said desired electronic file to said requesting user via said data network in real time;

said user retrieving said desired electronic file from said respective cache if it is locally cached and otherwise accepting said desired electronic file via streaming; and decrypting said desired electronic file in response to said decryption key.

32. The method of claim 31 further comprising the step of sending a file name under which said desired electronic file was previously stored in said cache to said requesting user with said decryption key.

33. The method of claim 31 wherein said transferring step is comprised of IP multicasting.

34. The method of claim 31 wherein said authorization includes the specification by said requesting user of payment information.

* * * * *